July 1, 1969  L. M. BURGESS ET AL  3,453,590

VEHICLE TIRE PRESSURE ALARM SYSTEM

Filed May 26, 1966

INVENTORS
LOUIS M. BURGESS
ROBERT I. SARBACHER

BY *Paris, Haskell & Levine*

ATTORNEYS

United States Patent Office 3,453,590
Patented July 1, 1969

3,453,590
VEHICLE TIRE PRESSURE ALARM SYSTEM
Louis M. Burgess, 6026 N. 9th St., Arlington, Va. 22205, and Robert I. Sarbacher, 400 Stemmons Tower S., Dallas, Tex. 75207
Filed May 26, 1966, Ser. No. 553,095
Int. Cl. B60c 23/04
U.S. Cl. 340—58        9 Claims

ABSTRACT OF THE DISCLOSURE

A system is disclosed for detecting the presence of low pressure in a vehicle tire. A signal generator in the form of a turbine is provided along with a low pressure valve in a tire valve stem, so that when tire pressure falls below a certain value the low pressure valve opens, and the escaping air drives the turbine. The turbine either generates a supersonic sound wave or drives an electromagnetic generator to generate a high frequency induction field. A detector on the vehicle senses the presence of such a signal, and in turn activates an alarm to inform the driver of the low pressure condition.

---

Figure 1:
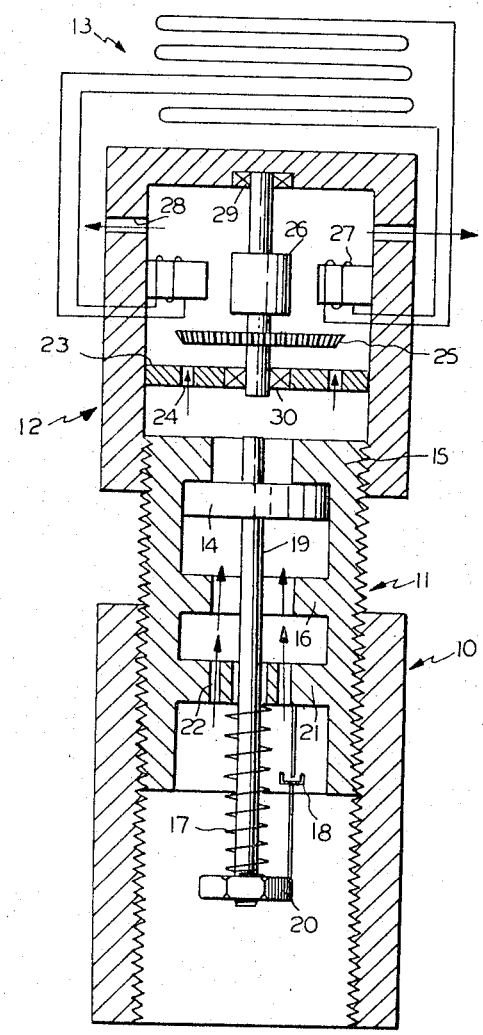

This invention relates to tire pressure warning indicator systems and more particularly to such systems that are self-powered by air flow from the tire and produce a high frequency wave that is transduced into an electrical signal suitable for operating warning lights and audible indicators.

In the past there have been many unsuccessful efforts to provide a reliable, effective, and comparatively inexpensive tire pressure warning device for signaling a low pressure condition in vehicle tires. These devices have ranged from rather primitive audible sounders to highly complex electrical and electronic circuits using miniature and subminiature electronic radio transmitters and receivers. The audible sound producers have been unsatisfactory in failing to always provide a reliable warning since the sound cannot always be heard by the driver over the various road noises or when the windows of the car or truck are closed due to adverse weather. The electrical and the electronic devices on the other hand are usually far too expensive in cost and installation for widespread uses, are subject to failure when subjected to rough road conditions, inclement weather, and extremes in temperature; as well as requiring periodic replacement of the electric batteries mounted on the vehicle wheels.

According to the present invention, there is provided a self-powered warning device and system that is not subject to these various failings. The detector portion of the system, mounted on the wheel, and responsive to low tire pressures, is both dependable and durable and is powered solely by the air flow released from the tire under low pressure conditions. This detector produces a high frequency nonaudible wave that is not obscured by road noise and is substantially unaffected by adverse road conditions or extremes in weather.

Very generally according to the invention, these advantages are provided by employing a high frequency nonaudible wave generator that is mounted directly on the tire and is powered solely by the air flow released from the tire under low pressure conditions. A transducer supported by the vehicle near this generator responds to the high frequency wave and produces an electrical signal that is transmitted to the dashboard or interior of the car or truck to operate a visual or audible indicator.

In a first embodiment, the generator comprises a miniature turbine that is rapidly rotated by the air flow to produce a supersonic sound wave and the transducer converts this high frequency wave to an electrical warning signal.

In a second embodiment, the minature turbine drives a miniature electric generator to produce a high frequency induction wave or field that is transduced into the electrical warning signal.

It is accordingly a principal object of the invention to provide a tire pressure warning system for vehicles that is comparatively inexpensive and reliable, and is relatively unaffected by poor road and driving conditions, adverse temperatures, and interfering noises.

A further object is to provide such a system producing a high frequency warning signal that is outside the range of frequencies of most noises and extraneous interference, and wherein the system is self-powered by air released from the tire being monitored.

Figure 2:
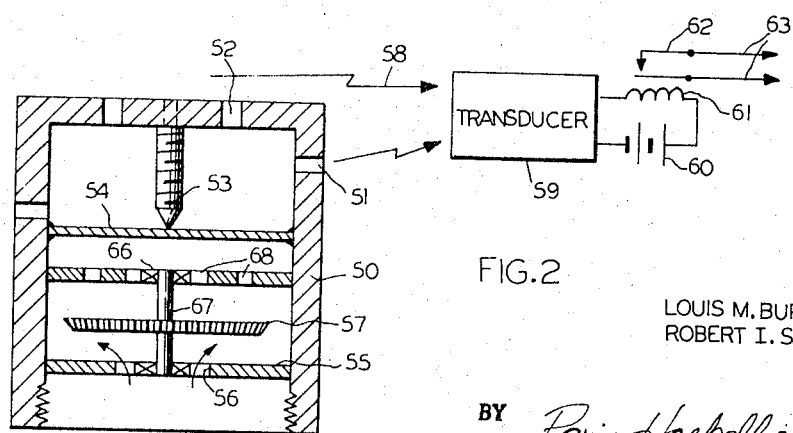

Other objects and many additional advantages will be more readily understood by those skilled in this art after a detailed consideration of the following specification taken with the accompanying drawings wherein:

FIG. 1 is a cross-sectional view illustrating one preferred embodiment of the invention for producing a high frequency magnetic field or wave in response to low tire pressure, and FIG. 2 is a cross-sectional view illustrating a similar mechanism for producing a high frequency supersonic sound wave.

Referring to FIG. 1, there is shown a first embodiment for producing a high frequency magnetic field upon detecting a low pressure condition in the tire that employs a low pressure valve unit 11, a miniature turbine driven electrical generator, indicated at 12, and an antenna winding 13 produces a high frequency magnetic indication field.

The low pressure valve 11 is embodied in a small cylindrical housing that is threaded on the outside and adapted to be inserted into the valve stem 10 of the tire. Within the housing is provided a reciprocally moveable valve member 14 supported on a valve rod 19 that is normally urged by a spring 17 away from an upper flange 15 forming an upper seat and toward a lower flange 16 forming a lower seat for the valve. When the tire is inflated to above a desired pressure, the air pressure acting on the lower surface of the valve 14 through the openings 22 in a plate 21, overcomes the downward pull of the spring 17 and forces the valve 14 against its upper seat to close the valve and prevent the escape of air from the tire. However, should the tire pressure fall below that set by the spring 17, the spring force moves the valve 14 away from its upper seat and permits air from the tire to escape into the generator. A suitable friction damper, generally indicated at 18, slows the downward movement of the valve member 14 for a given time delay after which the valve 14 engages with the lower seat 16 of the valve to cut off the escape of further air from the tire. As shown, the spring force 17 is adjustable by threading the nut 20 upwardly and downwardly on the valve rod 19 to preset the low pressure at which the valve 14 operates.

The air escaping from the tire during this time delay passes upwardly into a miniature turbine driven electrical generator 12 that is provided within a small hollow valve cap whose base is threaded to fit over and enclose the low pressure relief valve 11. In the interior of the cap and immediately above the valve 14 is provided an air driven turbine disc 25 rotatably supported on a shaft that is preferably aligned with and located above the valve rod 19, as shown. The escaping air passes upwardly from the low pressure relief valve through a plurality of tangentially disposed openings 24 in a support plate 23 to impinge against the blades of the turbine disc 25. Due to the very low inertia of the disc 25, the turbine is very rapidly rotated by these tangentially deflected air jets.

For generating a high frequency wave upon the escape of air from the tire, a miniature electrical generator is driven by the turbine disc 25 and produces a high frequency electrical signal through the coils 13. The coils 13 are located on the outside of the cap 12 and are preferably printed circuit coils imbedded in a suitable resin or plastic on the outer surface of the cap to more efficiently emanate the magnetic field, yet be protected by the resin covering against the dieleterious effects of moisture, dust and dirt particles.

The electrical generator employs a tiny permanent magnet member 26 mounted on the same shaft as the turbine disc 25 and located above the disc, as shown. A pair of stator poles project radially inwardly from the interior sides of the cap and carry stator windings 27 that are inductively coupled to the rotor. The high speed spinning of the turbine disc 25 correspondingly spins the permanent magnet rotor 26 thereby inducing high frequency voltage in the stator coils 27 that, in turn, directs a high frequency electrical current through the outer coils 13.

Thus upon the tire pressure falling below that preset by the valve spring 17, the valve opens for a given time interval permitting pressurized air jets derived from the tire to drive the turbine disc and electrical generator at high speed and produce a high frequency current in the outer coils 13.

For employing the high frequency warning wave to operate an indicator located on the dashboard or otherwise in the cab of the vehicle, an inductive transducer 59 (FIG. 2) is affixed to the body of the vehicle close to one or more of the tires whose pressure is being monitored by the detectors described above. This inductive transducer receives the high frequency magnetic wave and actuates a relay 61 to close its contact 62 and interconnect the wires 63. The wires 63 are provided as part of the standard electrical harness of the vehicle leading to an indicator located on the dashboard or elsewhere inside the auto or truck (not shown), and closing of these contacts 62 results in energizing the indicator to alert the driver to the danger.

Since the low pressure valve 11 operates for only a short time period to prevent the escape of an excessive quantity of air from the tire whose pressure is already reduced, the transducer circuit 59 is preferably provided with holding contacts (not shown) to maintain the relay 61 continuously energized once it has been energized as described above. Since such relay holding circuits are well known, a further description is considered unnecessary.

The turbine disc 57 is extremely small and possesses a very low momentum whereby the air jets passing through openings 24 in support plate 30 drive the disc 25 and rotor 26 at very high speed producing a high frequency magnetic field or wave in the range of 100,000 cycles per second. This frequency is far above the frequencies of any extraneous magnetic field interfering noise and accordingly insures the reliability operation of the warning system. Furthermore the placement of the transducer 59 in the immediate induction field further insures that the reliability of the system in responding to a detected low pressure in the tire.

In the embodiment of FIG. 2, the high frequency wave being produced is a supersonic sound wave, in the same range of frequencies as the magnetic wave discussed above, and the transducer 59 includes a miniature crystal detector (not shown) or other supersonic wave detector for responding to these high frequency sound waves. As in the above discussed embodiment, the hollow cap 50 includes a rotatably supported turbine disc 57 supported on a vertically mounted shaft 67 that is rotatably supported by bearings 66. The turbine disc 57 is also located directly above the small openings 56 in a plate 55 to receive the jets of air from the low pressure relief valve and thereby is rotatably driven at a very high speed. To provide the supersonic sound waves, a baffle plate 66 is disposed immediately above the turbine disc 57 and contains many small openings 68 that are suitably arranged with the turbine disc to provide a sounding chamber. The cap 50 has a series of larger openings 52 at the top and further openings 51 at the sides to permit the escape of air and the supersonic wave sound energy produced by the spinning turbine disc.

Since the high frequency generator in both embodiments is directly mounted on the tires, particles of dust, dirt, as well as moisture vapors can pass through the openings 28 in the cap of FIG. 1, and the openings 51 and 52 in the cap of FIG. 3, and might interfere with the proper operation of the high frequency generators. To prevent this from occurring, the interior of the cap 50 in both embodiments, may be provided with a rupturable diaphragm 54, such as shown in FIG. 2, to normally seal the turbine disc and other parts in the lower portion of the cap and prevent the particles and vapors from reaching these operating parts. Upon air escaping through the low pressure relief valve, this diaphragm is pressed upwardly against a piercing pin 53 to rupture the diaphram and permit the functioning of the generator as described above.

What is claimed is:

1. A low tire pressure alarm system for tires on a vehicle comprising a supersonic wave generator actuatable by air pressure and supported by the valve of the tire, a transducer supported by the vehicle in proximity to said generator for producing an electrical warning signal when energized by the supersonic wave, and a low pressure valve associated with the generator on the valve and responsive to low pressure in the tire for releasing air from the tire to actuate the supersonic generator, said generator including a miniature rotatably mounted turbine supported on the tire valve and actuatable by air from the tire as controlled by said low pressure valve to spin at high speed.

2. In the device of claim 1, said generator producing a supersonic sound wave, and said transducer converting the sound wave to an electrical warning signal.

3. In the device of claim 1, said generator comprising a miniature electromagnetic generator driven by said turbine to produce a high frequency magnetic field.

4. In the device of claim 1, said signal generator being disposed within a removable cap threaded over low pressure valve, and said low pressure valve being threadably connected to the valve stem on the tire.

5. A low pressure responsive signal alarm for vehicle tires comprising a signal generator and a low pressure valve supported on the valve of the tire, said valve being responsive to low pressure in the tire for releasing air to actuate said signal generator and said signal generator producing a high frequency nonaudible wave when actuated by the air flow, and a transducer supported on the vehicle in energy coupling relationship with the generator and responsive to the high frequency nonaudible wave to produce an electric warning signal, said wave generator including a miniature rotatably mounted turbine and a miniature electrical generator drivably coupled to the turbine, and said low pressure valve being responsive to low pressure in the tire to release air for rapidly rotating the turbine.

6. In the device of claim 5, said turbine and electrical generator being mounted within a small cap, and said cap and low pressure valve being detachably connectable to the tire valve.

7. In the device of claim 5, a miniature winding energized by the electric generator to produce a magnetic field at supersonic frequency.

8. In the device of claim 7, said generator being enclosed within a miniature cap and a rupturable diaphragm for protecting the turbine and electrical generator against extraneous matter prior to actuation by said low pressure valve.

9. In the device of claim 1, said generator comprising a baffle plate having a plurality of openings disposed in proximity to said turbine to produce a supersonic sound wave when the turbine is actuated, and a rupturable diaphragm for protecting the turbine and plate against extraneous matter prior to operation of said turbine.

References Cited

UNITED STATES PATENTS 3,145,689  8/1964  O'Neal _____ 340—58 XR
3,333,242  7/1967  Wooden _____ 340—58

ALVIN H. WARING, *Primary Examiner.*

U.S. Cl. X.R.
116—34; 200—61.25